United States Patent [19]

Kalamaras et al.

[11] Patent Number: 5,119,978
[45] Date of Patent: Jun. 9, 1992

[54] MOUNTED MULTIPLE DRINKING RESERVOIRS FOR BICYCLES AND THE LIKE

[76] Inventors: Nick J. Kalamaras, 35-11 Ditmars Blvd.; Rudolph Silvera, 21-65 35th St., both of Astoria, N.Y. 11105

[21] Appl. No.: 651,637

[22] Filed: Feb. 6, 1991

[51] Int. Cl.⁵ .............................. B62J 7/00; B62J 9/00
[52] U.S. Cl. ................................ 224/32 R; 222/610; 222/401; 215/1 A; 224/30 A; 224/148; 224/36
[58] Field of Search ............... 224/32 R, 30 R, 30 A, 224/35, 36, 37, 38, 148, 39; 222/608, 609, 610, 401, 175; 215/1 A

[56] References Cited

U.S. PATENT DOCUMENTS

| | | | |
|---|---|---|---|
| 581,767 | 5/1897 | Powers | 224/148 |
| 3,677,446 | 7/1972 | Guyer, Jr. et al. | 222/610 |
| 3,840,153 | 10/1974 | Devlin | 224/32 R |
| 4,095,812 | 6/1978 | Rowe | 224/32 R |
| 4,274,566 | 6/1981 | Rowe | 224/148 |
| 4,544,077 | 10/1985 | Rucker | 224/30 A |
| 4,699,318 | 10/1987 | Donatello et al. | 215/1 A |
| 4,807,813 | 2/1989 | Coleman | 222/175 |
| 4,852,781 | 8/1989 | Shurnick et al. | 224/148 |
| 4,911,339 | 3/1990 | Cushing | 222/610 |
| 5,024,358 | 6/1991 | Reichert et al. | 224/32 R |
| 5,060,833 | 10/1991 | Edison et al. | 215/1 A |

FOREIGN PATENT DOCUMENTS 2222578  3/1990  United Kingdom ............ 224/148

Primary Examiner—Charles E. Phillips
Assistant Examiner—Keith Kupferschmid
Attorney, Agent, or Firm—Richard L. Miller

[57] ABSTRACT

A drinking reservoir for a bicycle and the like consists of a housing having at least one compartment for storing a drinkable liquid therein, a mechanism for securing the housing to a portion of the bicycle and another mechanism for extracting the drinkable liquid from the at least one compartment in the housing so that a cyclist can consume the drinkable liquid contained therein without removing his hands from the control of the bicycle. A straw and a tube extend from the compartment enabling the cyclist to drink liquid through the straw and to blow into the tube to spray liquid out of the straw to cool off, alternately. One embodiment allows for rapid emptying and cleaning with a brush that can be easily brought into contact with an entire internal surface of the compartment when inserted therein.

2 Claims, 1 Drawing Sheet

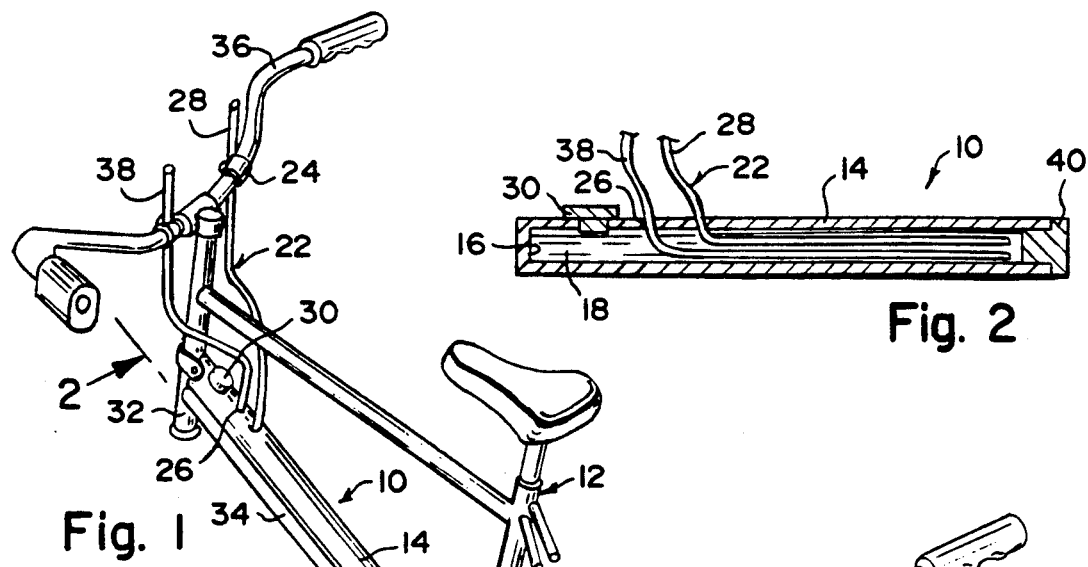
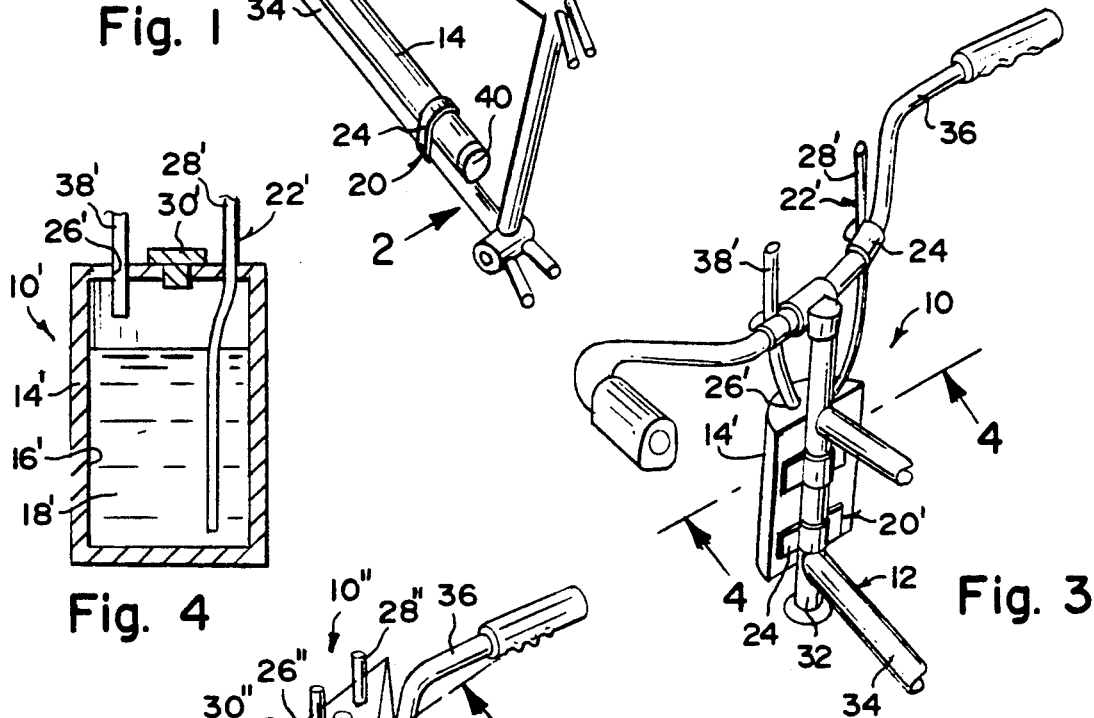
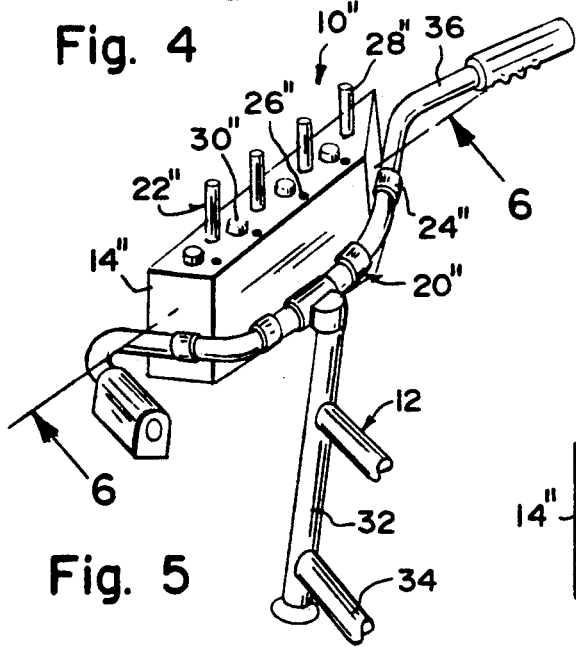
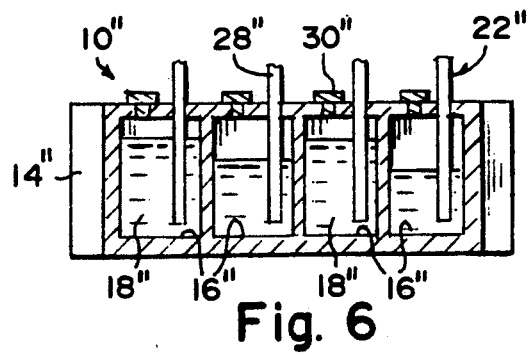

MOUNTED MULTIPLE DRINKING RESERVOIRS FOR BICYCLES AND THE LIKE

BACKGROUND OF THE INVENTION

The instant invention relates generally to water bottles for attachment to the frames of bicycles and more specifically it relates to a drinking reservoir for a bicycle and the like.

Numerous water bottles for attachment to the frame of bicycles have been provided in the prior art that are adapted to supply drinking water or the like to the cyclists during the operation of the bicycles. For example, U.S. Pat. Nos. 4,386,721 to Shimano; 4,441,638 to Shimano and 4,815,635 to Porter all are illustrative of such prior art. While these units may be suitable for the particular purpose to which they address, they would not be as suitable for the purpose of the present invention as hereafter described.

SUMMARY OF THE INVENTION

A primary object of the present invention is to provide a drinking reservoir for a bicycle and the like that will overcome the shortcomings of the prior art devices.

Another object is to provide a drinking reservoir for a bicycle and the like that contains a housing secured to the bicycle so that a drinkable liquid from at least one compartment in the housing can be consumed by a cyclist while not requiring that the cyclist remove his hands form the controls of bicycle.

An additional object is to provide a drinking reservoir for a bicycle and the like that is fabricated out of a durable reliable material.

A further object is to provide a drinking reservoir for a bicycle and the like that is simple and easy to use.

A still further object is to provide a drinking reservoir for a bicycle and the like that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of a bicycle frame with parts broken away illustrating a first embodiment of the instant invention installed thereon;

FIG. 2 is a diagrammatic cross sectional view taken on line 2—2 of FIG. 1;

FIG. 3 is a perspective view of the handle bars portion of a bicycle with parts broken away illustrating a second embodiment of the instant invention;

FIG. 4 is a diagrammatic cross sectional view taken on Line 4—4 of FIG. 2;

FIG. 5 is another perspective view of the handle bar portion of a bicycle with parts broken away illustrating a third embodiment of the instant invention; and FIG. 6 is a diagrammatic cross sectional view taken on Line 6—6 of FIG. 5.

DETAILED DESCRIPTION OF THE PREFERRED EMBODIMENTS

Turning now descriptively to the drawings, in which like reference characters denote like elements throughout the several views, the figures illustrate a drinking reservoir 10 for a bicycle 12 and the like consisting of a housing 14 having at least one compartment 16, for storing a drinkable liquid 18, such as water, soda, etc. therein. A mechanism 20 is for securing the housing 14 to a portion of the bicycle 12. Another mechanism 22 is for extracting the drinkable liquid 18 from the at least one compartment 16 in the housing 14 so that a cyclist can consume the drinkable liquid 18.

The securing mechanism 20 includes a plurality of clamp members 24. The extracting mechanism 22 includes the housing 14 having at least one vent 26 in the at least one compartment 16 and at least one straw 28 extending from the at least one compartment 16 in the housing 14 so that the cyclist can drink from the at least one straw 28. The drinking reservoir 10 further includes at least one filler cap 30 carried in the housing 14 so that the drinkable liquid 18 can be replaced when needed.

In FIG. 1, the housing 14 is attached by the clamp members 24 to the head tube 32 and downtube 34 of the bicycle frame 12. In FIG. 3, the housing 14 is attached by the clamp members 24 to the head tube 32 of the bicycle frame 12. In FIG. 5, the housing 14 is attached by the clamp members 24 to the handlebar 36.

The vents 26 in FIGS. 1 through 4 can both contain an elongated tube 38 so that during hot weather the cyclist can blow into the elongated tube 38 to spray the liquid 18 out of the straw 28 to cool off. The straw 28 and the elongated tube 38 are also connected to the handlebar 36 by the clamp members 24.

In FIGS. 1 and 2, the housing 14 is in an elongated cylindrical configuration having only one compartment 16. The housing 14 also includes a plug or threaded end cap 40 so that the compartment 16 can be quickly emptied and cleaned when necessary with a brush that can be easily brought into contact with the entire internal surface of the compartment 16 when inserted therein.

In the second and third examples shown in FIGS. 3-6, the bicycle 12 is the same as that shown in the first example and is therefore identified by using the same reference numerals. Similar, though not identical parts are identified by primed reference numerals in FIGS. 3 and 4 and by double primed reference numerals in FIGS. 5 and 6.

In the example shown in FIGS. 3 and 4, the reservoir 10' consists of a hemi-cylindrical housing 14' having a single compartment 16' containing liquid 18'. An extraction mechanism 22' includes the housing 14' having a vent 26' and a straw 28'. An elongate tube 38' extends through the vent 26' and a filler cap 30' closes the compartment 16'. A mechanism 20' for attaching the housing 14' to the front of the head tube 32 includes clamp members 24' and the straw 28' and tube 38' are attached to the handlebars by clamps member 24'.

In the example of FIGS. 5 and 6, the reservoir 10" consists of a housing 14" of prismatic shape divided internally into a series of separate compartments 16" each containing liquid 18". Filler caps 30" are provided for respective compartments and the liquid extraction mechanism 22" for attaching the housing 14" to the front of the handle bars includes clamps 24" on the handle bars.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A drinking reservoir for a bicycle which comprises:
   a) a housing having at least one compartment for storing a drinkable liquid therein;
   b) means for securing said housing to a portion of the bicycle; and
   c) first and second tubes having first ends extending into said compartment and opposite second ends extending upwardly from the compartment, and means for securing said second ends to a front portion of the bicycle so that the cyclist can, alternately, drink liquid from the compartment through any one of the tubes and blow into one of the tubes to spray the liquid out of the other tube to cool off without having to remove his hands from the controls of the bicycle.

2. A drinking reservoir for a bicycle according to claim 1 including clamping means for mounting on the handlebars of the bicycle for attaching respective tubes to the handlebars to upstand therefrom.

* * * * *